(12) United States Patent
Han

(10) Patent No.: US 11,434,795 B2
(45) Date of Patent: Sep. 6, 2022

(54) SILENCER FOR FUEL CELL VEHICLES

(71) Applicants: Hyundai Motor Company, Seoul (KR); KIA Motors Corporation, Seoul (KR)

(72) Inventor: Su Dong Han, Hwaseong-si (KR)

(73) Assignees: Hyundai Motor Company; Kia Motors Corporation

( * ) Notice: Subject to any disclaimer, the term of this patent is extended or adjusted under 35 U.S.C. 154(b) by 681 days.

(21) Appl. No.: 16/454,633

(22) Filed: Jun. 27, 2019

(65) Prior Publication Data

US 2020/0173321 A1 Jun. 4, 2020

(30) Foreign Application Priority Data

Nov. 30, 2018 (KR) .................. 10-2018-0151745

(51) Int. Cl.
| | |
|---|---|
| *F01N 1/08* | (2006.01) |
| *F01N 1/10* | (2006.01) |
| *H01M 8/04119* | (2016.01) |
| *H01M 8/04223* | (2016.01) |
| *F01N 1/18* | (2006.01) |
| *F01N 1/16* | (2006.01) |
| *B60L 50/70* | (2019.01) |
| *H01M 8/04089* | (2016.01) |
| *F01N 3/00* | (2006.01) |

(52) U.S. Cl.
CPC .............. *F01N 1/084* (2013.01); *B60L 50/70* (2019.02); *F01N 1/10* (2013.01); *F01N 1/166* (2013.01); *F01N 1/18* (2013.01); *F01N 3/005* (2013.01); *H01M 8/04089* (2013.01); *H01M 8/04156* (2013.01); *H01M 8/04253* (2013.01); *F01N 2470/02* (2013.01); *H01M 2250/20* (2013.01)

(58) Field of Classification Search
CPC ......... H01M 8/04089; H01M 8/04156; H01M 8/04253; F01N 1/084; F01N 1/166; F01N 1/18; F01N 2470/02; F01N 3/005; B60L 50/70
USPC .......................................................... 429/414
See application file for complete search history.

(56) References Cited

U.S. PATENT DOCUMENTS

| | | | | |
|---|---|---|---|---|
| 2013/0175114 A1* | 7/2013 | Heo | ......................... | F01N 1/089 181/233 |
| 2018/0171842 A1* | 6/2018 | Na | ........................... | F01N 3/005 |
| 2019/0288309 A1* | 9/2019 | Saitoh | ...................... | G01S 13/58 |

FOREIGN PATENT DOCUMENTS

| | | | | | |
|---|---|---|---|---|---|
| CN | 108580495 A | * | 9/2018 | ............. | B08B 1/001 |
| KR | 101464658 B1 | * | 11/2014 | ............... | F01N 1/10 |
| KR | 20160040748 A | * | 4/2016 | ............. | F01N 13/08 |

* cited by examiner

*Primary Examiner* — James M Erwin

(74) *Attorney, Agent, or Firm* — Lempia Summerfield Katz LLC

(57) ABSTRACT

Disclosed is a silencer for fuel cell vehicles. The silencer for fuel cell vehicles includes a housing having an inlet configured to receive air and hydrogen flowing into the housing therethrough, an outlet, and a condensation water drain hole configured to discharge condensation water to the outside therethrough, a distribution plate disposed in the housing and having distribution holes to distribute air and hydrogen flowing into the housing, a rotary plate disposed in the housing closer to the outlet than the distribution plate, a motor connected to the rotary plate to rotate the rotary plate, and an anti-freezing unit extending from one end of the rotary plate to the condensation water drain hole.

12 Claims, 3 Drawing Sheets

[FIG. 1]
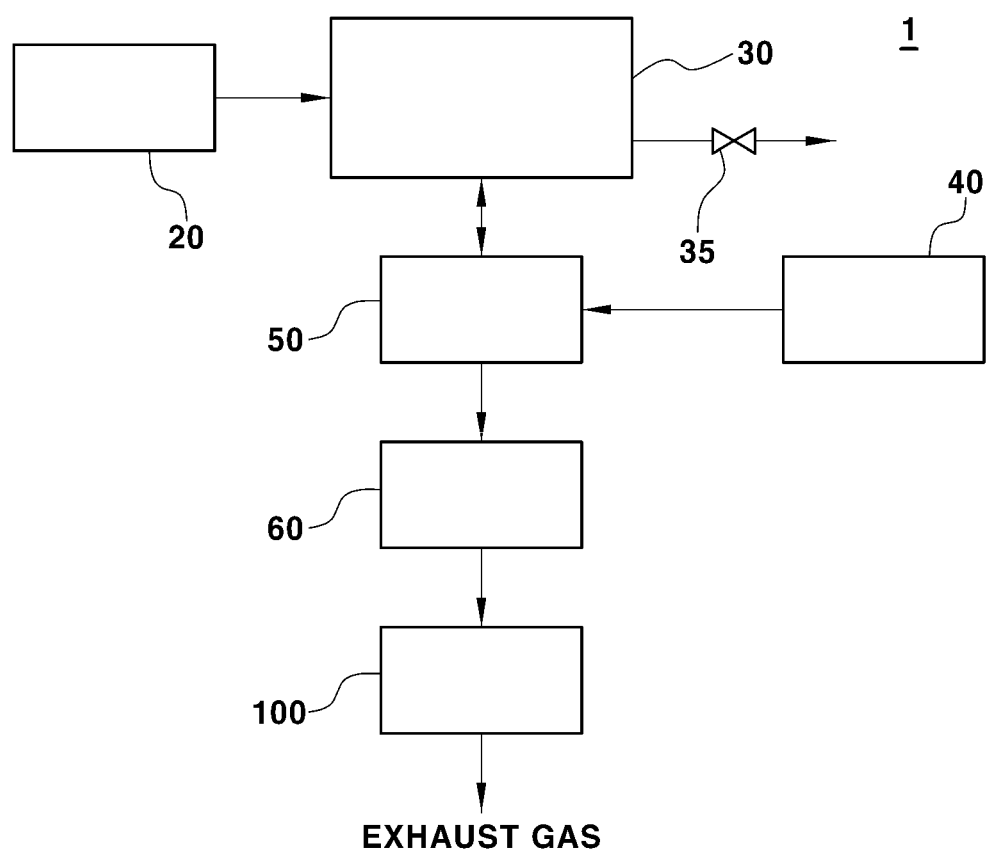

[FIG. 2]
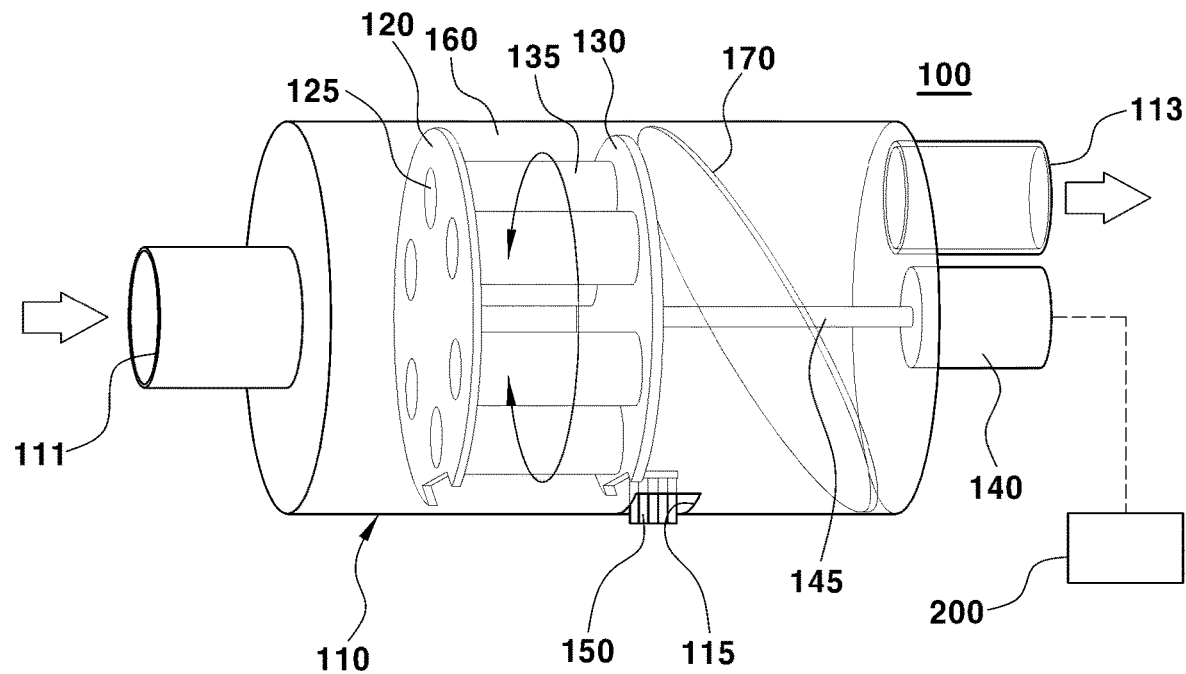
[FIG. 3]
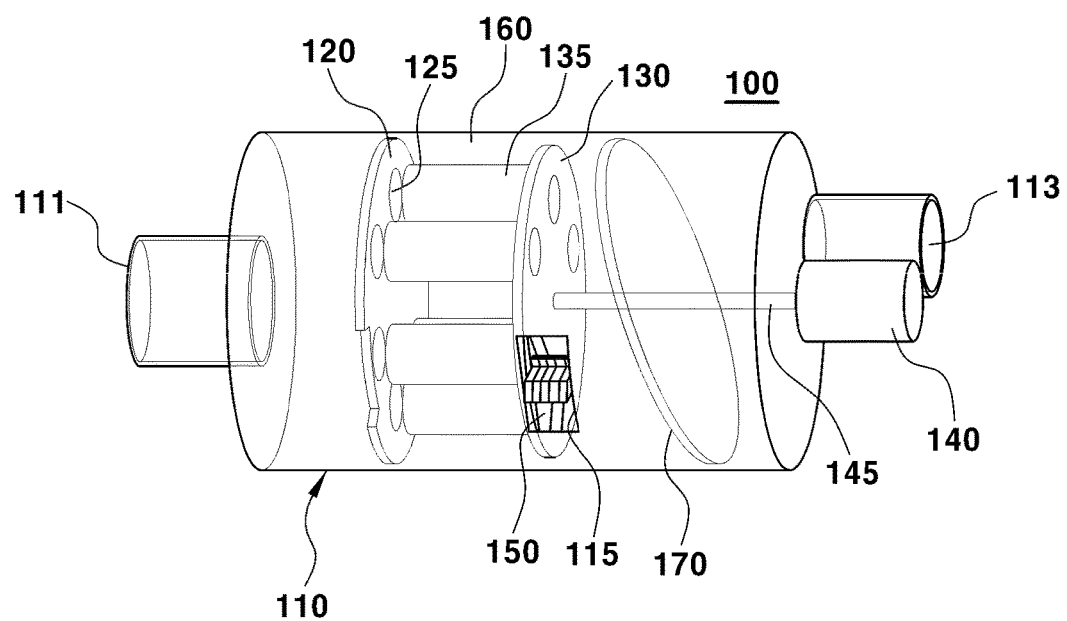

[FIG. 4]
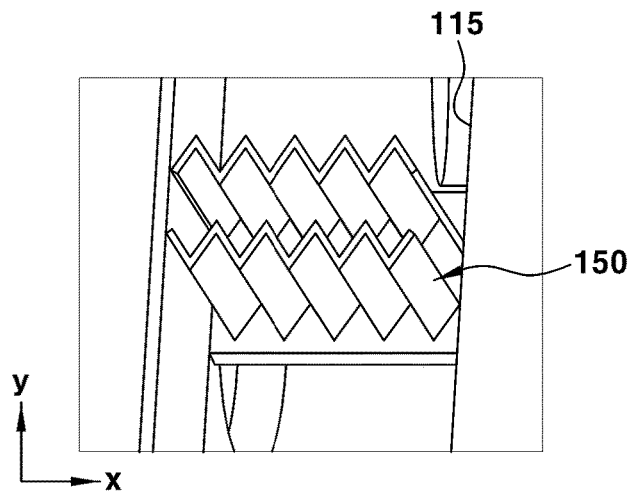
[FIG. 5]
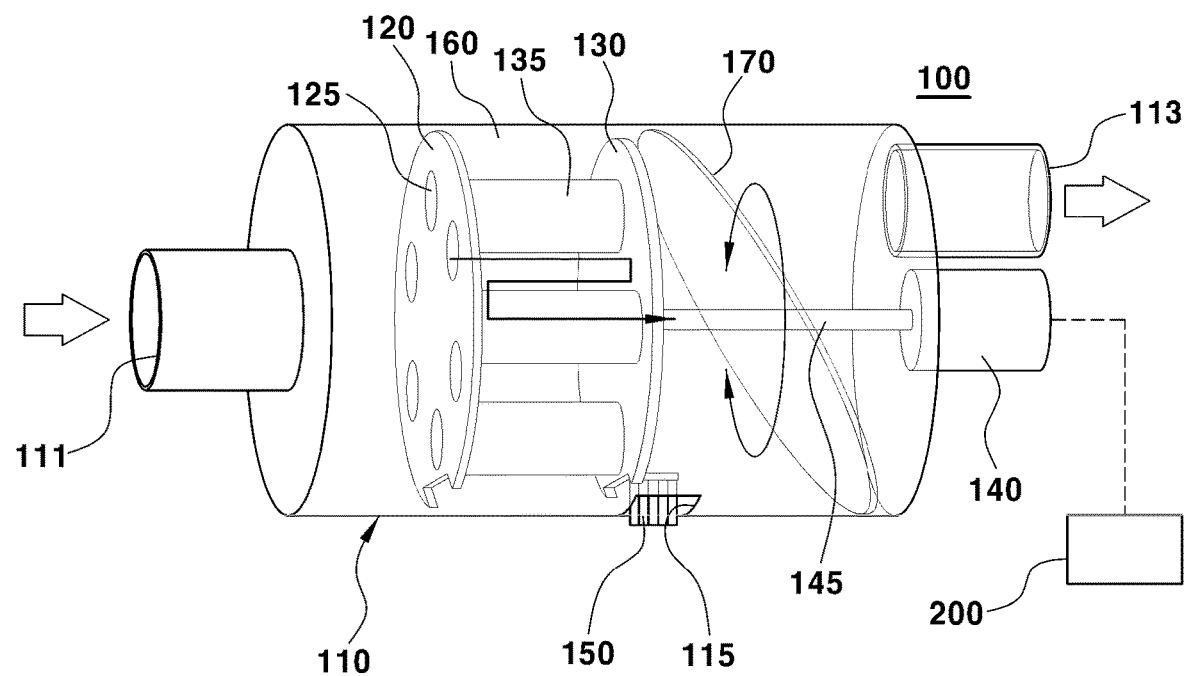

SILENCER FOR FUEL CELL VEHICLES

CROSS-REFERENCE TO RELATED APPLICATION

This application claims the benefit of and priority to Korean Patent Application No. 10-2018-0151745, filed on Nov. 30, 2018, the entire contents of which are incorporated herein by reference.

FIELD

The present disclosure relates to a silencer for fuel cell vehicles.

BACKGROUND

The statements in this section merely provide background information related to the present disclosure and may not constitute prior art.

In vehicles to which fuel cells are applied, condensation water is generated due to chemical reaction within a fuel cell stack. Therefore, a humidifier connected to an outlet of a fuel cell stack, an exhaust line connected to the humidifier, and a silencer installed at the exhaust line are applied to fuel cell vehicles. Condensation water generated by the fuel cell stack may be discharged through a drain hole in the silencer.

In a general exhaust structure of a fuel cell vehicle, when the vehicle is left in an idle state at an extremely low temperature, i.e., at an outdoor temperature of −10° C. or lower, condensation water is frozen and thus the vehicle shuts down. Particularly, if the condensation water is frozen around a drain hole configured to discharge the condensation water, it is difficult to remove the frozen condensation water.

SUMMARY

The present disclosure provides a silencer for fuel cell vehicles which may include an anti-freezing unit to mechanically crush frozen material produced by freezing condensation water.

In another aspect, the present disclosure provides a silencer for fuel cell vehicles which provides a separate space configured to mix hydrogen and air therein.

In one aspect, the present disclosure provides a silencer for fuel cell vehicles including a housing having an inlet configured to receive air and hydrogen flowing into the housing therethrough, an outlet, and a condensation water drain hole configured to discharge condensation water to the outside therethrough, a distribution plate disposed in the housing and having distribution holes to distribute air and hydrogen flowing into the housing, a rotary plate disposed in the housing closer to the outlet than the distribution plate, a motor connected to the rotary plate to rotate the rotary plate, and an anti-freezing unit extending from one end of the rotary plate to the condensation water drain hole.

In one form, the rotary plate may be rotated in both directions about a central axis of the rotary plate by the motor, and the anti-freezing unit may crush frozen material formed at the condensation water drain hole by rotation of the rotary plate.

In another form, the motor may be connected to the rotary plate by a motor shaft, and the motor may be disposed on an outer surface of, or at the outside of, the housing.

In still another form, the motor may rotate the rotary plate with varying a rotation angle and a rotation cycle of the rotary plate based on at least one factor selected from the group consisting of a vehicle outdoor temperature, a generation degree of condensation water, a purge cycle and a concentration of exhausted hydrogen.

In yet another form, the condensation water drain hole may be opened in a circumferential direction of the rotary plate and thus provide a space in which the anti-freezing unit is movable.

In still yet another form, a part of the anti-freezing unit may be exposed to the outside of the housing through the condensation water drain hole, and the anti-freezing unit may include uneven structures extending in a direction perpendicular to a central axis of the rotary plate.

In a further form, air pressure control units fixed to the rotary plate may be provided between the distribution plate and the rotary plate, and the number of the air pressure control units may correspond to the number of the distribution holes.

In another further form, the air pressure control units may extend from the rotary plate to the distribution plate, and the air pressure control units may have a cavity formed therein to exhaust air and hydrogen introduced through the distribution holes to the outlet.

In still another further form, an extending direction of the air pressure control units may not coincide with a forming direction of the distribution holes by rotation of the rotary plate and, if the extending direction of the air pressure control units does not coincide with the forming direction of the distribution holes, air and hydrogen may be mixed in a space between the distribution plate and the rotary plate.

In yet another further form, the extending direction of the air pressure control units may coincide with the forming direction of the distribution holes by rotation of the rotary plate and, if the extending direction of the air pressure control units coincides with the forming direction of the distribution holes, air and hydrogen introduced through the distribution holes may directly pass through the air pressure control units and be exhausted to the outlet.

In still yet another further form, an etching net provided with a plurality of micro-holes may be disposed between the rotary plate and the outlet, and the etching net may inhibit, or prevent, the condensation water from being discharged to the outside through the outlet.

In a still further form, the housing may have a cylindrical shape, the distribution plate and the rotary plate may have a disc shape, and a central axis of the housing may coincide with central axes of the distribution plate and the rotary plate.

Other aspects and forms of the disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a block diagram illustrating a fuel cell system in accordance with one aspect of the present disclosure;

FIG. 2 is a view illustrating a silencer in accordance with one aspect of the present disclosure;

FIG. 3 is another view illustrating the silencer in accordance with one aspect of the present disclosure;

FIG. 4 is a view illustrating an anti-freezing unit in accordance with one aspect of the present disclosure; and FIG. 5 is a view illustrating a flow path of hydrogen and oxygen according to rotation of a rotary plate in accordance with one aspect of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter reference will now be made in detail to various aspects of the present disclosure, examples of which are illustrated in the accompanying drawings and described below. While the disclosure will be described in conjunction with examples, it will be understood that the present description is not intended to limit the disclosure to these examples. On the contrary, the disclosure is intended to cover not only the examples, but also various alternatives, modifications, and equivalents within the spirit and scope of the disclosure as defined by the appended claims. In the following description, the same or similar elements are denoted by the same reference numerals even though they are depicted in different drawings.

In the following description, it will be understood that terms, such as "part", "unit", "module", etc., mean units to process at least one function or operation, and they may be implemented as hardware, software or a combination of hardware and software.

In addition, in the following description, it will be understood that terms, such as first, second, etc., are used only to distinguish one element from other elements and do not limit their sequence.

The following description illustrates the present disclosure. Further, the following description is given to describe aspects of the present disclosure, and the present disclosure may be used in various combinations, changes and environments. That is, various alternatives, modifications, and equivalents are possible within the spirit and scope of the disclosure as disclosed in the specification and equivalents thereto and/or techniques or technology in the art. The following are described only for a better understanding of the technical spirit of the disclosure and may be variously modified so as to meet requirements of a detailed application field and purpose of the disclosure. Therefore, it will be understood that the present description is not intended to limit the disclosure.

FIG. 1 is a block diagram illustrating a fuel cell system in accordance with one aspect of the present disclosure.

Referring to FIG. 1, a fuel cell system 1 may include a hydrogen supply unit 20, a fuel cell stack 30, an air supply unit 40, a humidifier 50, an air pressure control valve 60 and a silencer 100.

The hydrogen supply unit 20 may supply high-pressure hydrogen, supplied from a hydrogen tank, to the fuel cell stack 30. The high-pressure hydrogen may be decompressed through a regulator, and the decompressed hydrogen may be supplied to the fuel cell stack 30 under the condition that a supply quantity of the decompressed hydrogen is controlled through pressure control according to operating conditions of the fuel cell stack 30. After chemical reaction in the fuel cell stack 30, the remainder of the hydrogen may be exhausted through an outlet of a hydrogen electrode (an anode) of the fuel cell stack 30, or be recirculated to an inlet of the hydrogen electrode of the fuel cell stack 30 by a hydrogen recirculation apparatus (not shown).

The fuel cell stack 30 may generate electrical energy from electrochemical reaction between hydrogen serving as fuel and air including oxygen. The fuel cell stack 30 may have a structure in which a plurality of unit cells and a plurality of separators are alternately stacked. Each of the unit cells may include an air electrode, an electrolyte layer and a hydrogen electrode. For example, hydrogen supplied to the hydrogen electrode may be separated into hydrogen ions and electrons, the electrons may be moved to the air electrode through an external circuit, and, at the air electrode, oxygen may be combined with the electrons and thus produce oxygen ions. The oxygen ions may be moved to the hydrogen electrode through the electrolyte layer and be combined with the hydrogen ions at the hydrogen electrode and thus create a reactant, i.e., water. That is, one unit cell produces electric power through chemical bonding, and the hydrogen electrode and the air electrode become an anode and a cathode of the unit cell. Fuel cell stacks may be classified into a polymer electrolyte membrane fuel cell (PEMFC), a phosphoric acid fuel cell (PAFC), an alkaline fuel cell (AFC), a molten carbonate fuel cell (MCFC), a solid oxide fuel cell (SOFC), etc., according to kinds of electrolyte layers.

The fuel cell stack 30 may include a purge valve 35 to exhaust hydrogen within the hydrogen electrode of the fuel cell stack 30. The purge valve 35 may be opened or closed every predetermined purge cycle. However, the purge valve 35 may be controlled by the purge cycle calculated according to a separate measurement factor. For example, when a power generation amount of the fuel cell stack 30 is increased, the purge cycle may be shortened.

Further, sensors (not shown) may be disposed at the outlet of the hydrogen electrode of the fuel cell stack 30, and the sensors (not shown) may measure pressures applied to hydrogen introduced into the fuel cell stack 30 and hydrogen exhausted from the fuel cell stack after reaction and concentrations thereof.

The air supply unit 40 may supply air to the humidifier 50, and the humidifier 50 may supply the air to the air electrode of the fuel cell stack 30. The humidifier 50 may humidify dry air supplied through an air compressor of the air supply unit 40 using moisture in high-temperature and high-humidity air exhausted from the air electrode of the fuel cell stack 30, and supply the humidified air to the air electrode of the fuel cell stack 30.

The air pressure control valve 60 may be disposed at the rear of the humidifier 50. Wet air exhausted through the outlet of the air electrode of the fuel cell stack 30 may exchange moisture with dry air supplied by the air supply unit 40 while the wet air passes through the humidifier 50, and then be exhausted to the atmosphere via the air pressure control valve 60.

The silencer 100 may be disposed at the rear of the air pressure control valve 60. The silencer 100 may be installed at an exhaust side of the vehicle, and hydrogen and air exhausted from the fuel cell stack 30 may be introduced into the silencer 100. A detailed structure of the silencer 100 will be described below.

FIG. 2 is a view illustrating the silencer in accordance with the present disclosure, and FIG. 3 is another view illustrating the silencer in accordance with one aspect of the present disclosure.

Referring to FIGS. 1 to 3, the silencer 100 may include a housing 110, a distribution plate 120, a rotary plate 130, a motor 140 and an anti-freezing unit 150.

The housing 110 may have an inlet 111, into which air and hydrogen flow, and an outlet 113, and include a condensation water drain hole 115 to exhaust condensation water generated by chemical reaction in the fuel cell stack 30. The housing 110 may have a cylindrical shape. The condensation water drain hole 115 may be formed between the distribution plate 120 and the outlet 113. The condensation water drain hole 115 may be formed through the side surface of the housing 110, and extend in a circumferential direction about a central axis of the housing 110. The central axis of the housing 110 may mean an axis passing through the centers of cross sections of the cylindrical housing 110.

The distribution plate 120 may be disposed in the housing 110 and distribute air and hydrogen flowing into the housing 110. The distribution plate 120 may have a disc shape. A central axis of the distribution plate 120 may coincide with the central axis of the housing 110. Pressures of air and hydrogen flowing into the housing 110 are primarily reduced according to contact with the distribution plate 120 and then the air and hydrogen may pass through distribution holes 125 defined on the distribution plate 120. The distribution holes 125 may distribute air and hydrogen and be provided in plural on the distribution plate 120.

The rotary plate 130 may be disposed in the housing 110 and be rotated in the housing 110. The rotary plate 130 may be disposed to be closer to the outlet 130 of the housing 110 than the distribution plate 120. The rotary plate 130 may have a disc shape. The rotary plate 130 may be connected to a motor 140 installed on an outer surface of, or at the outside of, the housing 110 through a motor shaft 145, and be rotated in both directions by driving of the motor 140. The rotary plate 130 may be rotated in both directions about a central axis thereof. The central axis of the rotary plate 130 may coincide with the central axis of the housing 110. The motor shaft 145 may extend in a direction coinciding with the central axis of the rotary shaft 130.

The rotary shaft 130 may include air pressure control units 135 serving as passages through which air and hydrogen flows toward the outlet 113. The air pressure control units 135 may be provided to be fixed to the rotary plate 130. The air pressure control units 135 may extend from the rotary plate 130 to the distribution plate 120. For example, the air pressure control units 135 may have a cylindrical shape, without being limited thereto. The number of the air pressure control units 135 may correspond to the number of the distribution holes 125. The air pressure control units 135 may have a cavity formed therein. Open regions of the air pressure control units 135 may coincide with a forming direction of the distribution holes 125 according to rotation of the rotary plate 130. In other words, an extending direction of the air pressure control units 135 and an opening direction of the distribution holes 125 may coincide with each other. One end of the air pressure control unit 135 may contact the rotary plate 130, and the other end of the air pressure control unit 135 may be spaced apart from the distribution plate 120. That is, since the air pressure control units 135 and the distribution plate 120 are spaced apart from each other by a designated distance, air and hydrogen introduced through the distribution holes 125 may be exhausted to the outlet 113 through the air pressure control units 135, and flow into an inner space 160 defined by the distribution plate 120 and the rotary plate 130. The air and hydrogen introduced into the inner surface 160 may be mixed.

For example, if the extending direction of the air pressure control units 135 and the forming direction of the distribution holes 125 coincide with each other according to rotation of the rotary plate 130, air and hydrogen introduced through the distribution holes 125 may directly pass through the air pressure control units 135 and be exhausted to the outlet 113.

The motor 140 may be connected to the rotary plate 130 through the motor shaft 145 and thus rotate the rotary plate 130. Although, in this form, the motor 140 is installed at the outside of the housing 110, the motor 140 may be installed at the inside of the housing 110. The motor 140 may rotate the rotary plate 130 on a predetermined cycle, or rotate the rotary plate 130 on a cycle set according to a measured value of a measurement factor. The motor 140 may be interlocked with a controller 200. The controller 200 may calculate a rotation angle and a rotation cycle of the rotary plate 130 based on a measured value of at least one of measurement factors, such as an idle time, an outdoor temperature, a generation degree of condensation water, a purge cycle and a concentration of exhausted hydrogen. The motor 140 may rotate the rotary plate 130 according to the rotation angle and rotation cycle calculated by the controller 200. Here, the outdoor temperature may be measured by a separate outdoor temperature sensor (not shown) attached to the vehicle. The generation degree of condensation water may be calculated based on an amount of vapor generated by the fuel cell stack 30, temperatures of the inlet and outlet of the fuel cell stack 30, and pressures at the inlet and outlet of the fuel cell stack 30. The purge cycle may be calculated according to the power generation amount of the fuel cell stack 30 and, when the power generation amount of the fuel cell stack 30 is increased, the purge cycle may be shortened. The concentration of exhausted hydrogen may be measured by a sensor (not shown) installed at the hydrogen electrode of the fuel cell stack 30.

The anti-freezing unit 150 may be fixedly installed at one end of the rotary plate 130 and crush frozen material formed at the condensation water drain hole 115. The anti-freezing unit 150 may have a blade-shaped structure to mechanically crush the frozen material. The frozen material is formed by freezing condensation water generated by the fuel cell stack 30. The frozen material may be formed by freezing condensation water when the vehicle is in an idle state for a long time at an outdoor temperature of −10° C. or lower. The anti-freezing unit 150 may extend from one end of the rotary plate 130 to the condensation water drain hole 115 and be exposed to the outside of the housing 110 by the condensation water drain hole 115. The condensation water drain hole 115 may be opened in a circumferential direction based on the central axis of the rotary plate 130 and thus provide a space in which the anti-freezing unit 150 is movable. Therefore, the rotary plate 130 may be rotated such that the anti-freezing unit 150 is movable within the space defined by the condensation water drain hole 115, and the motor 140 may rotate the rotary plate 130 with sufficient motor torque for the anti-freezing unit 150 to crush the frozen material.

An etching net 170 may be provided in the housing 110. The etching net 170 may be disposed between the rotary plate 130 and the outlet 113. The etching net 170 may serve to inhibit or prevent condensation water from being discharged through the outlet 113. The etching net 170 may be provided with a plurality of micro-holes (not shown) defined to pass air and hydrogen and not to pass condensation water. The etching net 170 may have an oval plate shape, and a central axis of the etching net 170 may not coincide with the central axis of the housing 110. That is, the etching net 170 may be disposed obliquely in the housing 110. However, the shape and position of the etching net 170 are not limited thereto, and the etching net 170 may have a shape which may block a space between the rotary plate 130 and the outlet 113 to inhibit or prevent condensation water from being discharged to the outside through the outlet 113. Further, the etching net 170 may have a disc shape in the same manner as the distribution plate 120 and the rotary plate 130.

In accordance with one form of the present disclosure, the silencer 100 for fuel cell vehicles may include the anti-freezing unit 150 configured to mechanically remove frozen material formed around the condensation water drain hole 115. The motor 140 may rotate the rotary plate 130 according to the rotation angle and rotation cycle deduced by the controller 200 to cyclically crush the frozen material.

Further, in accordance with one form of the present disclosure, hydrogen and air may flow into the inner space 160 between the distribution plate 120 and the rotary plate 130 by rotation of the rotary plate 130, and be mixed in the inner space 160 to produce water. The motor 140 may cyclically rotate the rotary plate 130 and thus control amounts of hydrogen and air introduced into the inner space 160. Therefore, the silencer 100 for fuel cell vehicles may reduce a concentration of hydrogen in mixed gas through the cyclically rotated rotary plate 130.

FIG. 4 is a view illustrating the anti-freezing unit in accordance with one aspect of the present disclosure.

Referring to FIGS. 2 and 4, a part of the anti-freezing unit 150 may be exposed to the outside of the housing 110 through the condensation water drain hole 115. The condensation water drain hole 115 may be opened in the circumferential direction of the rotary plate 130 and thus provide a space in which the anti-freezing unit 150 is movable. In FIG. 4, the rotation axis of the rotary plate 130 may be a y-axis direction, and the circumferential direction of the rotary plate 130 may be an x-axis direction. The anti-freezing unit 150 may extend in a direction perpendicular to the rotation axis of the rotary plate 130 and include uneven structures. For example, the anti-freezing unit 150 may include uneven structures arranged in a plurality of rows.

FIG. 5 is a view illustrating a flow path of hydrogen and oxygen according to rotation of the rotary plate in accordance with one aspect of the present disclosure.

Referring to FIGS. 1 and 5, the extending direction of the air pressure control units 135 and the opening direction of the distribution holes 125 may not coincide with each other according to rotation of the rotary plate 130. That is, passages within the air pressure control units 135 may not coincide with the distribution holes 125. In this case, air and hydrogen introduced through the distribution holes 125 do not flow into the air pressure control units 135 and may just be introduced into the inner space 160. Some of air and hydrogen within the inner space 160 may react to produce water, and air and hydrogen which do not react may be exhausted through the air pressure control units 135. Therefore, a concentration of hydrogen in mixed gas (air and hydrogen) may be cyclically reduced according to rotation of the rotary plate 130.

In accordance with one aspect of the present disclosure, the controller 200 may calculate a rotation angle and a rotation cycle of the rotary plate 130 based on a measured value of at least one selected from the group consisting of an idle time, an outdoor temperature, a generation degree of condensation water, a purge cycle and a concentration of exhausted hydrogen, and the motor 140 may rotate the rotary plate 130 according to the rotation angle and the rotation cycle calculated by the controller 200. Therefore, the silencer 100 for fuel cell vehicles may reduce a concentration of hydrogen in mixed gas by rotating the rotary plate 130 in consideration of change in a power generation amount of the fuel cell stack 30, the outdoor temperature, etc., and mechanically crush frozen material formed around the condensation water drain hole 115.

As is apparent from the above description, a silencer for fuel cell vehicles in accordance with one aspect of the present disclosure may mechanically remove frozen material formed around a condensation water drain hole. Here, a motor may rotate a rotary plate according to a rotation angle and a rotation cycle deduced by a controller so as to cyclically crush the frozen material.

Further, the silencer for fuel cell vehicles in accordance with one aspect of the present disclosure may allow hydrogen and air to be introduced into an inner space between a distribution plate and the rotary plate by rotation of the rotary plate, and reduce a concentration of hydrogen in mixed gas by chemical reaction within the inner space.

The disclosure has been described in detail with reference to forms thereof. However, it will be appreciated by those skilled in the art that changes may be made in these forms without departing from the principles and spirit of the disclosure.

What is claimed is:

1. A silencer for fuel cell vehicles comprising:
    a housing having:
        an inlet configured to receive air and hydrogen flowing into the housing therethrough,
        an outlet, and
        a condensation water drain hole configured to discharge condensation water to the outside therethrough;
    a distribution plate disposed in the housing and having distribution holes configured to distribute air and hydrogen flowing into the housing;
    a rotary plate disposed in the housing closer to the outlet than the distribution plate;
    a motor connected to the rotary plate and configured to rotate the rotary plate; and
    an anti-freezing unit extending from one end of the rotary plate to the condensation water drain hole.

2. The silencer for fuel cell vehicles of claim 1, wherein:
    the rotary plate is configured to rotate in both directions about a central axis of the rotary plate by the motor; and
    the anti-freezing unit is configured to crush frozen material formed at the condensation water drain hole by rotation of the rotary plate.

3. The silencer for fuel cell vehicles of claim 1, wherein:
    the motor is connected to the rotary plate by a motor shaft; and
    the motor is disposed on an outer surface of the housing.

4. The silencer for fuel cell vehicles of claim 1, wherein the motor is configured to rotate the rotary plate with varying a rotation angle and a rotation cycle of the rotary plate based on at least one factor selected from the group consisting of a vehicle outdoor temperature, a generation degree of condensation water, a purge cycle and a concentration of exhausted hydrogen.

5. The silencer for fuel cell vehicles of claim 1, wherein the condensation water drain hole is opened in a circumferential direction of the rotary plate and thus provides a space in which the anti-freezing unit is movable.

6. The silencer for fuel cell vehicles of claim 1, wherein:
a part of the anti-freezing unit is exposed to the outside of the housing through the condensation water drain hole; and
the anti-freezing unit comprises uneven structures extending in a direction perpendicular to a central axis of the rotary plate.

7. The silencer for fuel cell vehicles of claim 1, wherein:
air pressure control units fixed to the rotary plate are provided between the distribution plate and the rotary plate; and
a number of the air pressure control units corresponds to a number of the distribution holes.

8. The silencer for fuel cell vehicles of claim 7, wherein:
the air pressure control units extend from the rotary plate to the distribution plate; and
the air pressure control units have a cavity formed therein that is configured to exhaust air and hydrogen introduced through the distribution holes to the outlet.

9. The silencer for fuel cell vehicles of claim 8, wherein:
an extending direction of the air pressure control units does not coincide with a forming direction of the distribution holes by rotation of the rotary plate; and
if the extending direction of the air pressure control units does not coincide with the forming direction of the distribution holes, air and hydrogen are mixed in a space between the distribution plate and the rotary plate.

10. The silencer for fuel cell vehicles of claim 8, wherein:
an extending direction of the air pressure control units coincides with a forming direction of the distribution holes by rotation of the rotary plate; and
if the extending direction of the air pressure control units coincides with the forming direction of the distribution holes, air and hydrogen introduced through the distribution holes directly pass through the air pressure control units and are exhausted to the outlet.

11. The silencer for fuel cell vehicles of claim 1, wherein an etching net provided with a plurality of micro-holes is disposed between the rotary plate and the outlet,
wherein the etching net inhibits the condensation water from being discharged to the outside through the outlet.

12. The silencer for fuel cell vehicles of claim 1, wherein:
the housing has a cylindrical shape, and the distribution plate and the rotary plate have a disc shape; and
a central axis of the housing coincides with central axes of the distribution plate and the rotary plate.

\* \* \* \* \*